United States Patent
Popescu

(10) Patent No.: US 11,413,990 B2
(45) Date of Patent: Aug. 16, 2022

(54) TUBE JOINTS WITH CONSISTENT FRICTION TORQUE AND NO CLEARANCE GAP

(71) Applicant: Adient Luxembourg Holding S.à r.l., Luxembourg (LU)

(72) Inventor: Horatiu M. Popescu, Plymouth, MI (US)

(73) Assignee: Adient US LLC, Plymouth, MI (US)

( * ) Notice: Subject to any disclaimer, the term of this patent is extended or adjusted under 35 U.S.C. 154(b) by 918 days.

(21) Appl. No.: 16/308,968

(22) PCT Filed: Jun. 8, 2017

(86) PCT No.: PCT/US2017/036495
§ 371 (c)(1),
(2) Date: Dec. 11, 2018

(87) PCT Pub. No.: WO2017/218281
PCT Pub. Date: Dec. 21, 2017

(65) Prior Publication Data
US 2019/0329673 A1    Oct. 31, 2019

Related U.S. Application Data

(60) Provisional application No. 62/350,427, filed on Jun. 15, 2016.

(51) Int. Cl.
*B64G 1/64*     (2006.01)
*B60N 2/16*    (2006.01)
(Continued)

(52) U.S. Cl.
CPC ............ *B60N 2/1615* (2013.01); *F16C 11/04* (2013.01); *F16C 33/20* (2013.01); *F16C 43/02* (2013.01);
(Continued)

(58) Field of Classification Search
CPC ... B60N 2/1615; B60N 2205/20; F16C 11/04; F16C 33/20; F16C 43/02; F16C 2326/08
(Continued)

(56) References Cited

U.S. PATENT DOCUMENTS 3,380,791 A    4/1968   Peck
3,801,209 A *  4/1974   Matsuoka ............. F16C 27/063
                                                    384/296
(Continued)

FOREIGN PATENT DOCUMENTS

DE          24 56 725 A1    6/1976

*Primary Examiner* — Todd M Epps
(74) *Attorney, Agent, or Firm* — Marshall & Melhorn, LLC

(57) ABSTRACT

A bushing assembly includes a tube with an outer bearing surface, a metal part with an annular flange defining an opening and a plastic bushing with a bushing hub with an inner annular bushing contact surface and an axially extending metal part engagement surface. A friction torque setting connection is formed between the annular flange and the bushing hub and defines a rotational and axial connection between the annular flange and the bushing hub. The connection is configured to vary a radial force applied between the annular flange and the bushing hub with a deformation of bushing plastic material. This is to vary friction between the bushing contact surface and the tube outer bearing surface upon applying a torque to the plastic bushing, causing rotation and axial movement of the plastic bushing relative to the metal part, and causing the deformation of plastic material of the bushing hub.

19 Claims, 8 Drawing Sheets

(51) Int. Cl.
*F16C 11/04* (2006.01)
*F16C 33/20* (2006.01)
*F16C 43/02* (2006.01)

(52) U.S. Cl.
CPC ...... *B60N 2205/20* (2013.01); *F16C 2326/08* (2013.01)

(58) Field of Classification Search
USPC ................ 403/223, 119; 384/296; 296/65.01
See application file for complete search history.

(56) References Cited

U.S. PATENT DOCUMENTS

2006/0251470 A1* 11/2006 Prause .................. B60N 2/682
   403/119
2010/0014793 A1* 1/2010 Bingert .................. F16C 11/04
   296/65.01

* cited by examiner

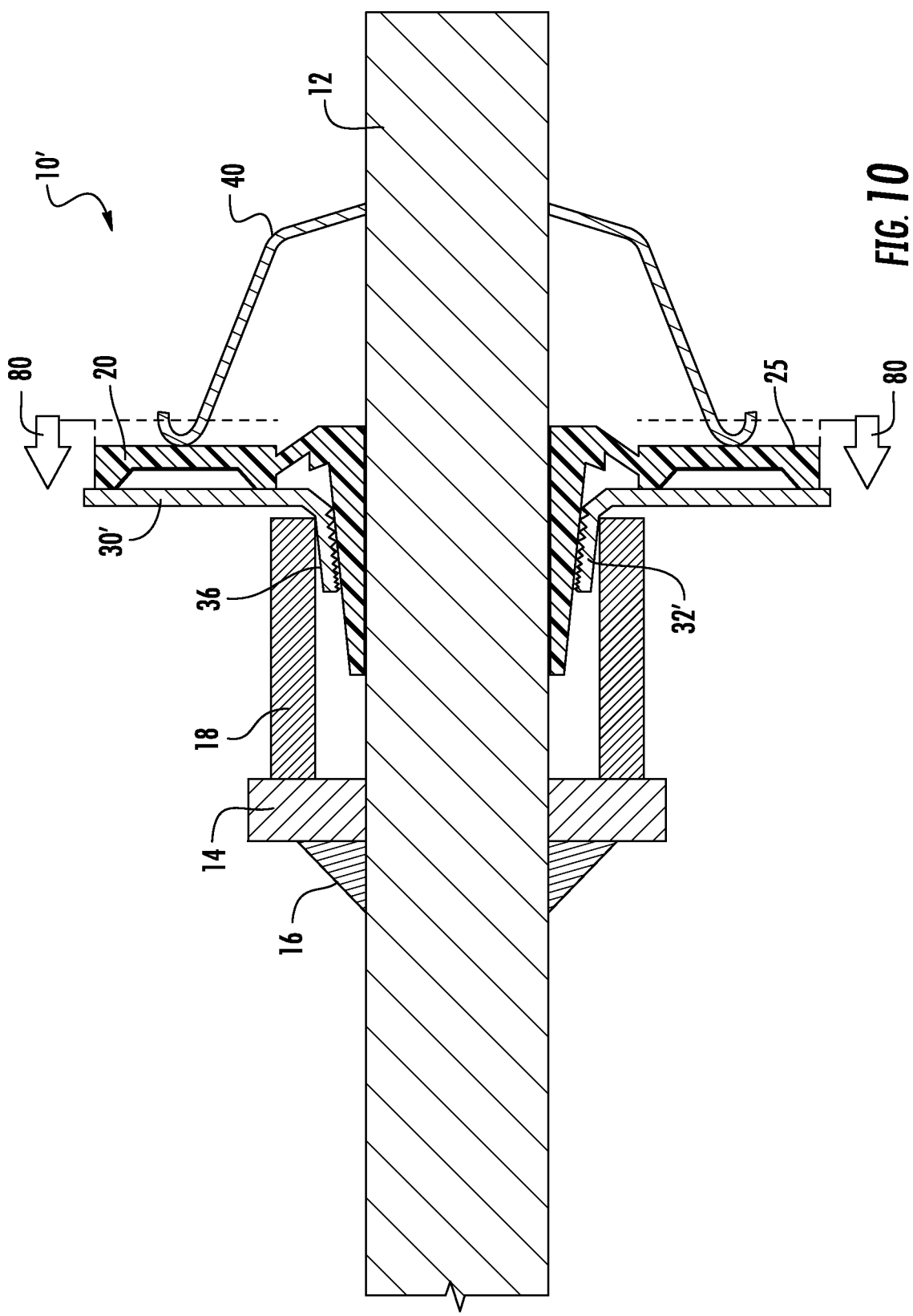

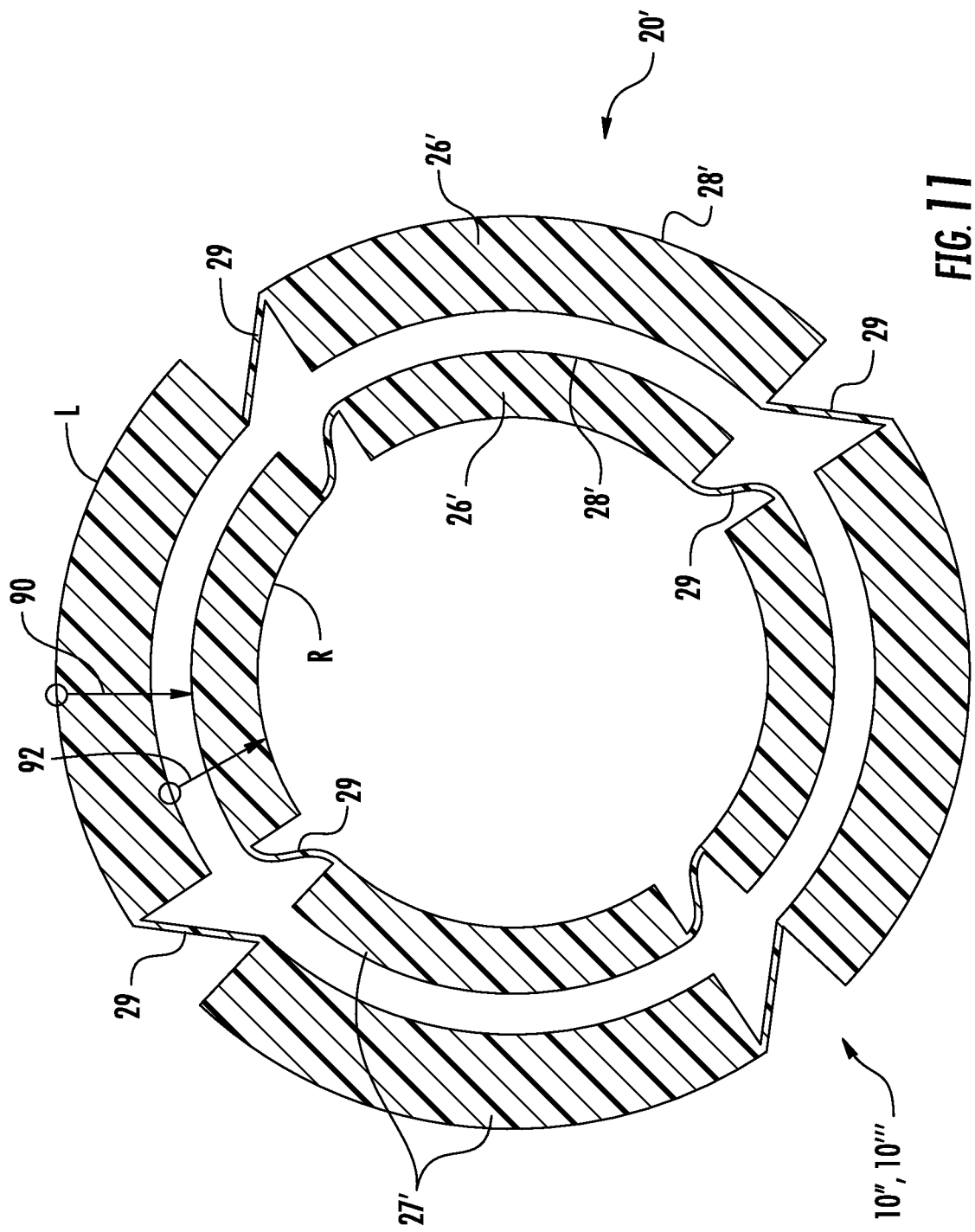

TUBE JOINTS WITH CONSISTENT FRICTION TORQUE AND NO CLEARANCE GAP

CROSS REFERENCE TO RELATED APPLICATIONS

This application claims the benefit of priority of U.S. provisional application 62/350,427, filed Jun. 15, 2016, the entire contents of which are incorporated herein by reference.

FIELD OF THE INVENTION

The present invention relates to tube joints, in particular journal bearings with the journal in the form of a tube in a bushing supported at the connected part, such as a tube joint of a motor vehicle seat or seat component or other vehicle component.

BACKGROUND OF THE INVENTION

A plain bearing is a bearing which carries a load by a relative sliding of connected parts of a joint. A plain bearing or journal bearing or tube joint includes a shaft or tube running through a part with a hole. The part with the hole may have a sleeve or liner, also known as a bushing.

Tube joints of vehicle seats may include an extrusion part, which is a frame part of a vehicle seat base (also known as a cushion). The opening may be formed with an annular flange that supports a plastic bushing. The bushing may instead be a bronze insert or some other bushing formed of another material that is different from the frame part. A tube is passed through the bushing and the tube is able to rotate relative to the frame part—rotate relative to a seat base. Such a tube joint may be part of the system with several joints. For example, a system to raise and lower a seat base relative to a vehicle floor may comprise plural tube joints. Such a system of joints may include a so-called four bar linkage at each side of the seat base. In this case, four joints are provided at each seat side. Two joints are at each vehicle seat frame side part—a vehicle seat base (cushion) B-bracket that is the extrusion part. Two joints are at each vehicle moveable track part of a vehicle seat track, which cooperates with a track part fixed to the vehicle floor. The four bar linkage comprises the extrusion part (B-bracket) as one bar, two connecting linkages forming two other bars and the moveable track part as a forth bar. A similar four bar linkage is provided at the other side of the vehicle seat. The two four bar linkage arrangements allow a raising and a lowering of the seat base (the cushion B-brackets), relative to the vehicle seat moveable track.

Such a four bar linkage includes four different tube joints. It is problematic if each of the tube joints presents a slightly different frictional connection with the respective tube. It is also problematic if a joint at one side of the vehicle seat base (e.g., at one B-bracket) has a different frictional connection with the tube than a joint at an opposite side of the vehicle seat base (e.g., at another B-bracket). Further, the mechanical connection between the plastic bushing and the tube may present some clearance issues. It is problematic if such clearance is different at each of the four joints or at opposite seat sides.

Other tube joint arrangements or joint systems, particularly in motor vehicle applications, present similar issues. Various cranks and linkage arrangements consist of a system with multiple joints. Differing clearances and differing frictional characteristics between the various joints of the same plural tube joint system is disadvantageous.

SUMMARY OF THE INVENTION

An object of the present invention is to provide a tube joint in which the friction torque can be set consistently to provide a consistent friction torque for a plurality of joints in a system and to have no clearance gap for the plurality of joints in the system.

According to the invention, a bushing assembly is provided comprising a tube with an outer bearing surface, a metal part comprising an annular flange defining an opening in the metal extrusion part and a plastic bushing. The plastic busing has a bushing hub defining a tube opening with an inner annular bushing contact surface. The tube is received in the tube opening. The bushing hub also has an axially extending metal part engagement surface. A friction torque setting connection is formed between the annular flange and the bushing hub. The friction torque setting connection defines a rotational and axial connection between the annular flange and the bushing hub and is configured to vary a radial force applied between the annular flange and the bushing hub, upon a deformation of bushing plastic material, to vary friction between the bushing contact surface and the tube outer bearing surface. Upon applying a torque to the plastic bushing, the plastic bushing is caused to rotate relative to the metal part and is caused to axially move relative to the metal part, causing deformation of plastic material of the bushing hub.

The torque applied to the plastic bushing sets the friction between the bushing contact surface and the tube outer bearing surface. This is based on a relationship between the friction between the bushing contact surface and the tube outer bearing surface and the torque applied to the plastic bushing.

The annular flange may have an inner flange surface defining the opening. The friction torque setting connection may comprise threading on the flange inner surface and the bushing hub plastic material having a change in bushing hub plastic material thickness, over an axial extent of the bushing hub. With this configuration, rotation of the plastic bushing relative to the metal part advances the engagement surface along a course of the threading to advance the inner flange surface axially relative to and over the surface of the bushing hub plastic to deform the bushing hub plastic material in a contact region between the flange inner surface and the engagement surface.

The engagement surface may advantageously be conical. The bushing hub plastic material thickness increases from a plastic bushing axial front end to an axial rear end. The annular flange inner flange surface of the metal part may be conical.

The plastic bushing may further comprise a bushing flange extending radially outwardly from the bushing hub. The bushing flange may comprise a circumferential engagement surface.

The metal part may comprise a circumferential engagement complementary surface. The circumferential engagement surface engages the complementary surface to rotationally fix the plastic bushing relative to the metal part. The circumferential engagement surface may comprise a plurality of grooves circumferentially spaced and arranged about a circumferential extent of the bushing flange. The circumferential engagement complementary surface may comprise at least one rib formed on a surface of the metal part surrounding the annular flange of the metal part.

An axial stop may welded to the tube for stopping axial movement of the metal part and the plastic bushing, connected by the friction torque setting connection, relative to the tube in an axial direction. A retaining ring may be axially fixed to the tube and may be in contact with the bushing flange. The retaining ring biases the bushing flange toward the surface of the metal part to press one of the grooves to the at least one rib to rotationally fix the plastic bushing relative to the metal part.

According to another aspect of the invention, a vehicle seat base arrangement is provided comprising a vehicle seat base with a bushing assembly according to the invention. The metal part is a side bracket of the vehicle seat base. The vehicle seat base may further comprise further bushing assemblies according to the invention. The torque applied to the further plastic bushing is essentially the same as the torque applied to the plastic bushing to set the friction between the further bushing contact surface and the further tube outer bearing surface to be essentially the same as the friction set between the bushing contact surface and the tube outer bearing surface.

According to another aspect of the invention, a method is provided comprising providing a tube joint (bushing assembly) according to the invention such that a plurality of bushing assemblies are provided with torque applied to the further plastic bushing that is essentially the same as the torque applied to the plastic bushing to set friction between the further bushing contact surface and the further tube outer bearing surface to be essentially the same as the friction set between the bushing contact surface and the tube outer bearing surface.

According to still another aspect of the invention, a joint system is provided comprising a plurality tube joints comprised of one or more metal parts with annular flanges with openings and one or more tubes. One of the joints comprises a tube outer bearing surface cooperating with a plastic bushing and a further of the joints comprises a further tube outer bearing surface cooperating with a further plastic bushing. Each plastic bushing comprises a bushing hub defining a tube opening with an inner annular bushing contact surface. The tube is received in the tube opening. Each plastic bushing further comprises an axially extending metal part engagement surface. A friction torque setting connection is provided between each annular flange and the respective bushing hub. The friction torque setting connection defines a rotational and axial connection between the annular flange and the bushing hub and is configured to vary a radial force applied between the annular flange and the bushing hub with a deformation of bushing plastic material to vary friction between the bushing contact surface and the tube outer bearing surface. Upon applying a torque to the plastic bushing the plastic bushing is caused to rotate relative to the metal part causing axial movement of the plastic bushing relative to the metal part and causing a deformation of the plastic material of the bushing hub. The tube joints are formed by applying a torque to the plastic bushing relative to one of the metal parts that is essentially the same as torque applied to the further plastic bushing relative to one of the metal parts to set friction between the bushing contact surface and the tube outer bearing surface that is essentially the same as the friction set between the further bushing contact surface and the further tube outer bearing surface.

The one or more metal parts of the plurality of tube joints may be the same metal part with plural annular flanges. The one or more metal parts of the plurality of tube joints may be different metal parts, each of the different metal parts having at least one of the annular flanges. The one or more tubes may comprise a same tube with the tube outer bearing surface cooperating with the plastic bushing and the further tube outer bearing surface cooperating with the further plastic bushing. The one or more tubes may comprise different tubes comprising a first tube with the tube outer bearing surface and a second tube with the further tube outer bearing surface.

It is apparent that the above-described features, which will also be explained below, can be used not only in the particular combination described, but also in other combinations or alone, without going beyond the scope of the present invention.

Preferred exemplary embodiments of the present invention are shown in the drawings and will be explained in more detail in the following description, where identical reference numbers designate identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 10 is a schematic cross-sectional view of a tube joint/bushing assembly according to another embodiment of the invention;

FIG. 11 is a schematic transverse sectional view of a plastic cone of a plastic bushing according to an alternative embodiment of the invention, showing the plastic cone of a plastic bushing in both an initial, large state L and in a reduced state R;

DESCRIPTION OF THE PREFERRED EMBODIMENTS

Figure 1:
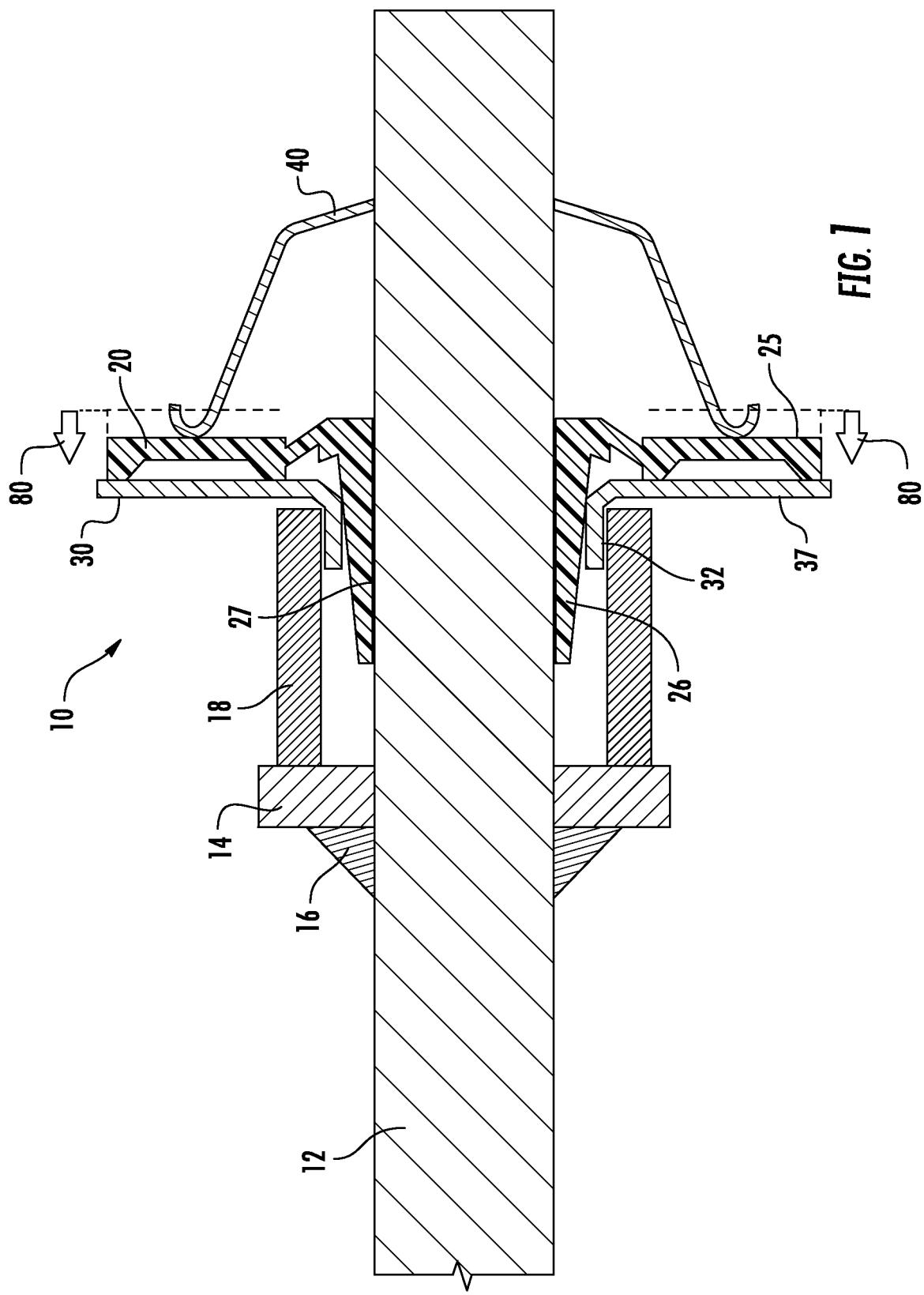
FIG. 1 is a schematic cross-sectional view of a tube joint/bushing assembly according to the invention.

Referring to the drawings, FIG. 1 shows a bushing assembly (also referred to as a tube joint) generally designated 10. The bushing assembly 10 includes a tube 12 with an outer bearing surface with an axial stop 14 welded to the bearing surface via a weld 16. An annular spacer 18 is positioned on the tube 12, abutting the stop 14. A plastic bushing 20 comprises a bushing hub that defines a tube opening. The bushing hub is in the form of a bushing hub cone 26 with a hub inner annular surface 27, that is a tube contact surface. The tube 12 is received in the tube opening that is defined by the hub inner annular surface 27. The outer surface of the bushing hub cone 26 forms an axially extending extrusion engagement surface 28 (FIG. 4).

Figure 4:
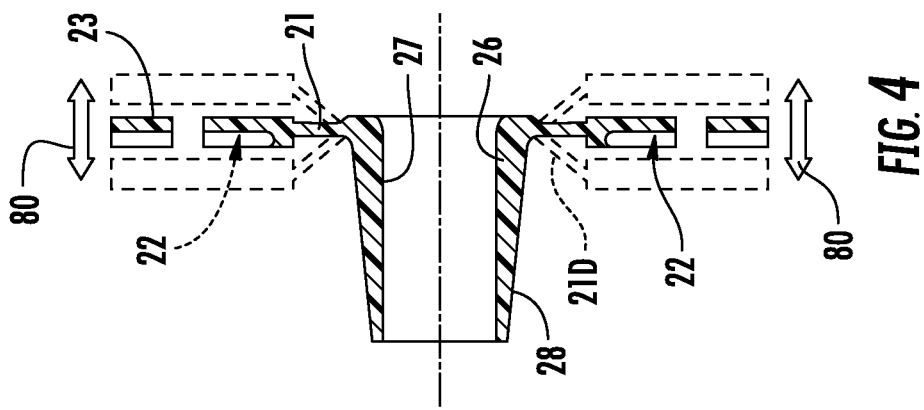
FIG. 4 is a schematic side cross-sectional view of the plastic bushing of FIG. 2 showing a flexure range of the bearing flange.
Figure 3:
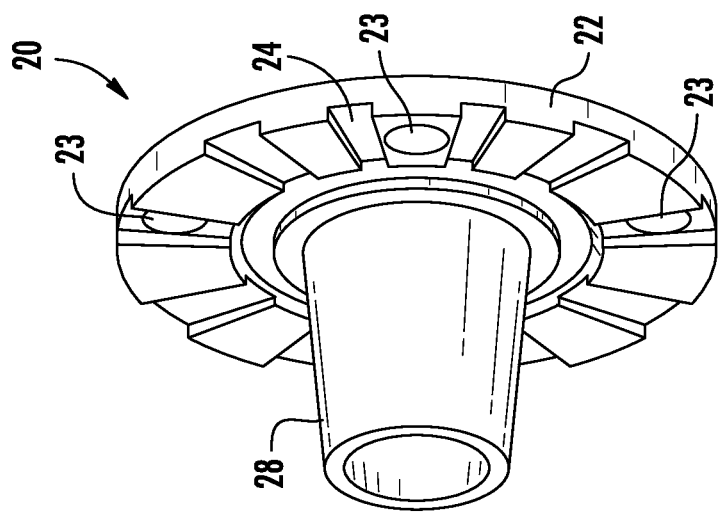
FIG. 3 is a front side perspective view of the plastic bushing of FIG. 2.
Figure 2:
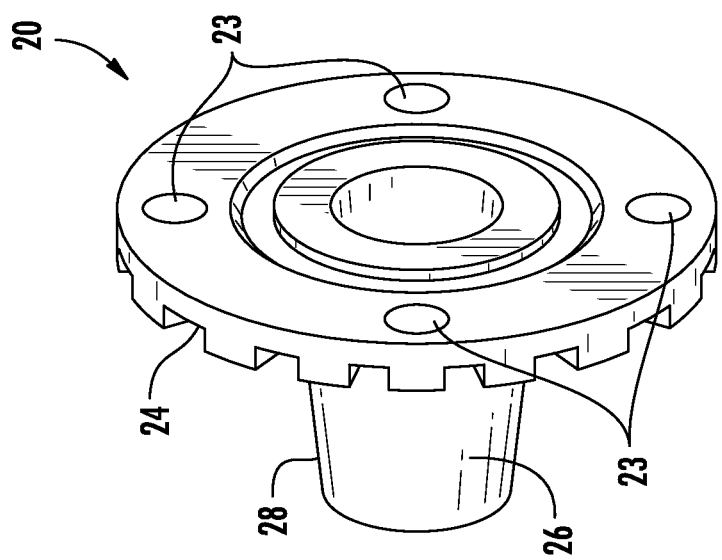
FIG. 2 is a rear side perspective view of a plastic bushing according to the invention.

As can be seen in FIGS. 2, 3 and 4, the plastic bushing 20 has a bushing flange 22 that is connected to the bushing hub cone 26 by a deformable web 21. The bushing flange 22 has torque tool engagement openings 23 at a rear side flange surface 25. The bushing flange 22 has a front surface with a plurality of grooves 24.

The bushing assembly 10 includes a metal part 30 with an opening receiving the tube 12, on which the metal part 30 bears. The tube 12, in a mounted state is rotatable relative to the metal part 30. In the embodiment of FIGS. 1-15, the metal part 30 is a seat base (cushion) frame side part, particularly a B-bracket. The metal part 30 is an extrusion part but could be a variety of metal parts including a bent or stamped part formed of sheet steel or a cast part.

Figure 9:
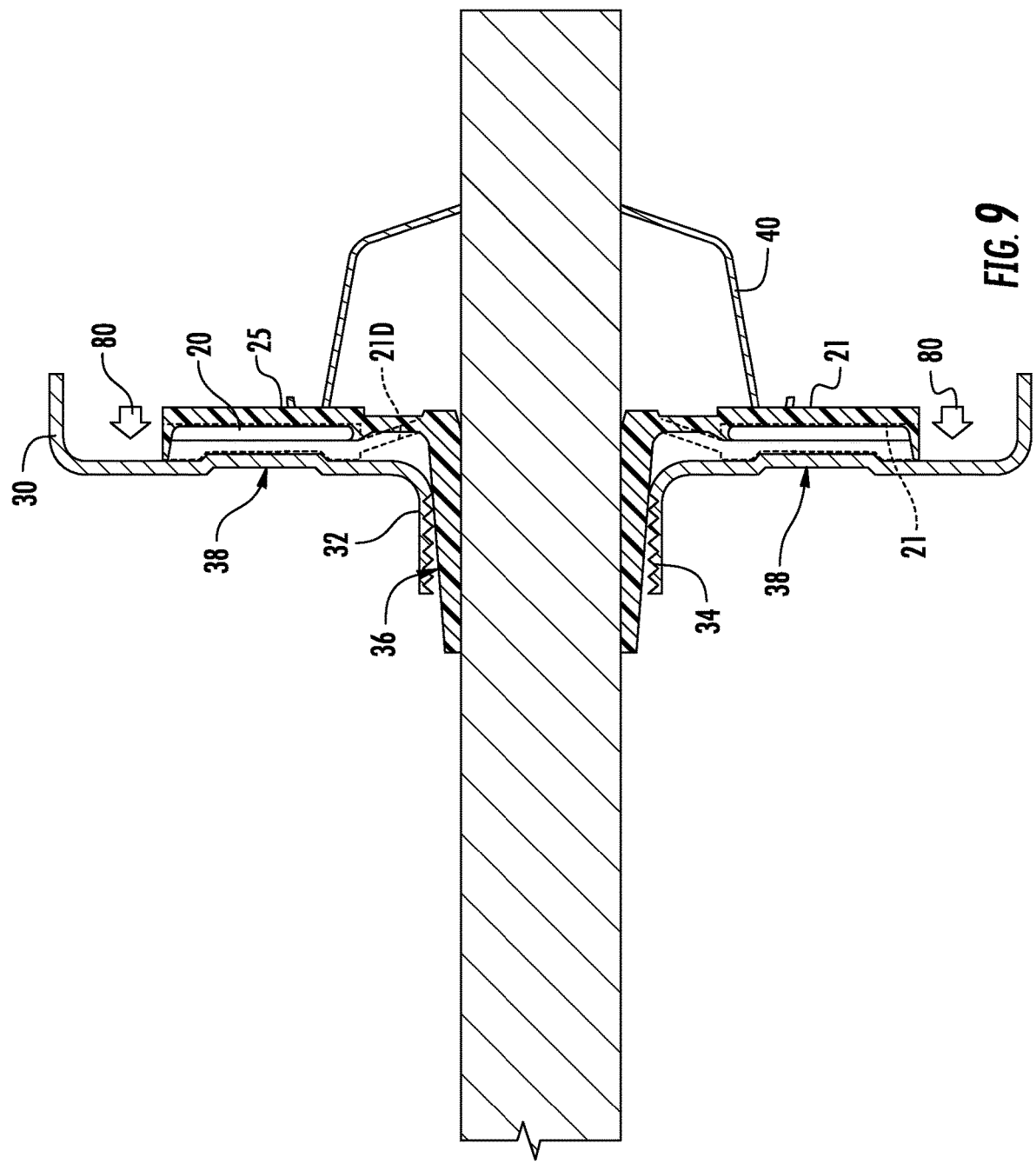
FIG. 9 is a schematic cross-sectional view showing another assembly stage of the bushing assembly of FIG. 1.

As shown in FIG. 9, the metal part 30 comprises an annular flange 32 that has an inner flange surface defining the opening 34. An inner surface of the extrusion annular flange 32 has inner extrusion threads (threading) 36. As described further below, the inner extrusion threads 36 form a part of a friction torque setting connection that also includes the plastic material of the bushing hub cone 26. The metal part 30 has a side wall 37 formed with one or more ribs 38. The embodiments of FIGS. 1-15 provide the side wall 37 with two ribs 38, disposed at an upper (12 o'clock) position and at a lower (6 o'clock) position. Although only a single rib 38 may be provided, having plural ribs may provide some advantages. The rib or ribs 38 interact with the grooves 24 to rotationally fix the plastic bushing 20 relative to the metal part 30, particularly to rotationally fix the bushing flange 22 relative to the side wall 37. The rotational fixation is provided by sidewalls of a respective rib or ribs 38 engaging sidewalls of a respective groove 24. In particular, each rib 38 engages one of the grooves 24 to provide a rotation lock or rotational fixation of the plastic bushing 20 relative to the metal part 30.

Figure 13:
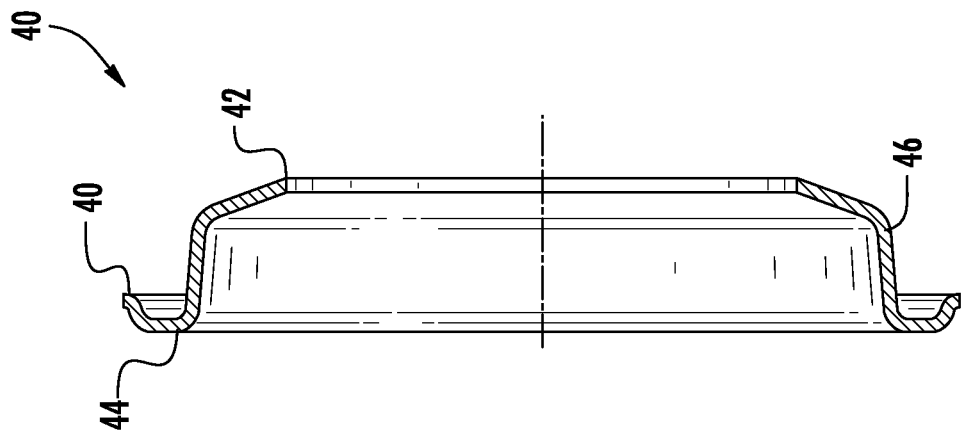
FIG. 13 is a cross-sectional view taken along line 13-13 of FIG. 12.
Figure 12:
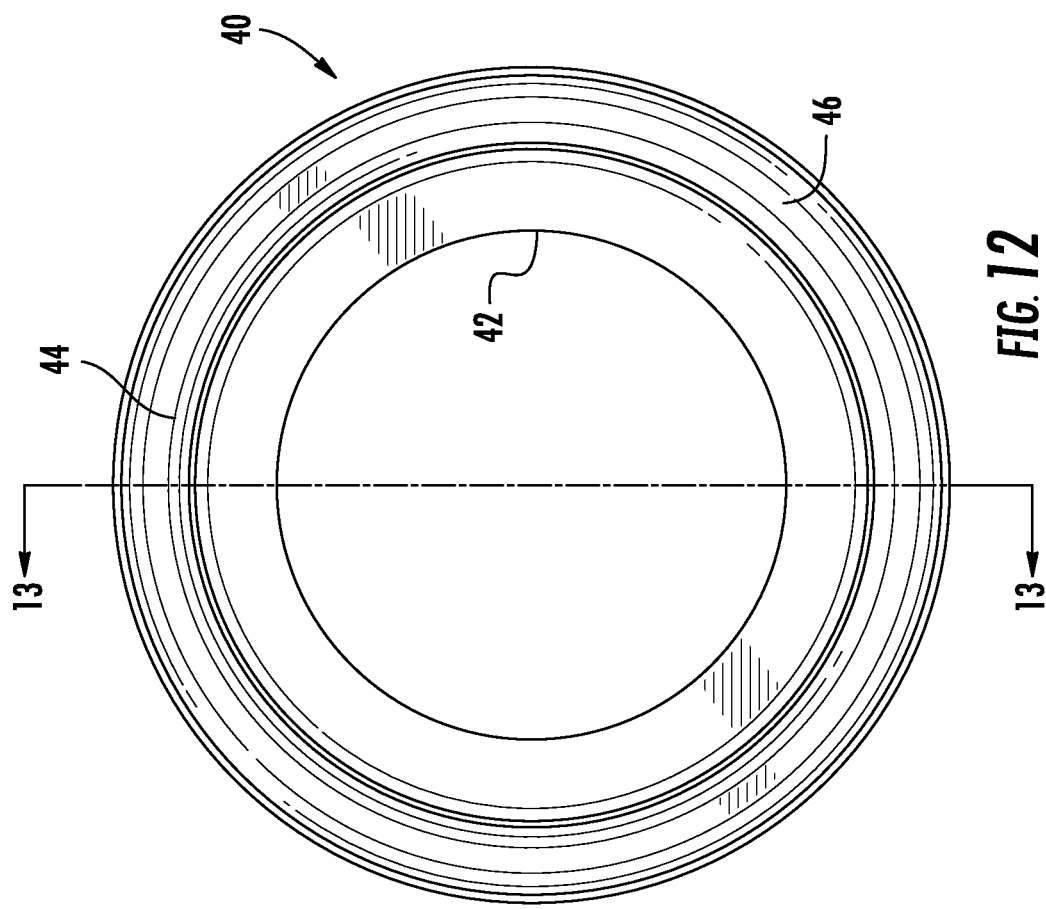
FIG. 12 is a front view of a retainer ring according to the invention.

FIGS. 12 and 13 show a retainer ring generally designated 40. The retainer ring 40 has an edge surface 42 which engages the outer surface of tube 12. The retainer ring 40 presses the bushing flange 22 against a side of the wall 37 of the metal part 30. The edge surface 42 acts as an axial stop engaged with the tube 12. The retainer 40 has a spring action based on spring walls 46, such that a slip surface 44 of retainer ring 40 bears against the flange surface 25, maintaining a groove 24 in engagement with a corresponding rib 38. The edge surface 42 is not fixedly engaged with the tube 12 but will rotate with the tube 12 as the slip surface 44 slides or slips along the flange surface 25.

Figure 5:
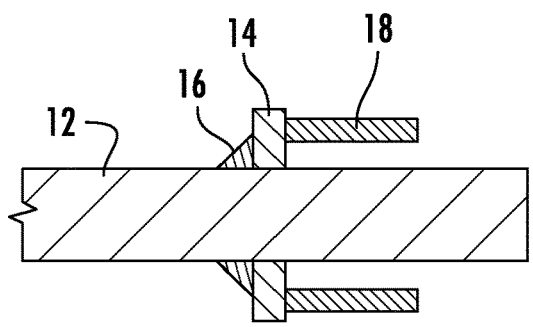
FIG. 5 is a schematic cross-sectional view showing an assembly stage of the bushing assembly of FIG. 1.
Figure 6:
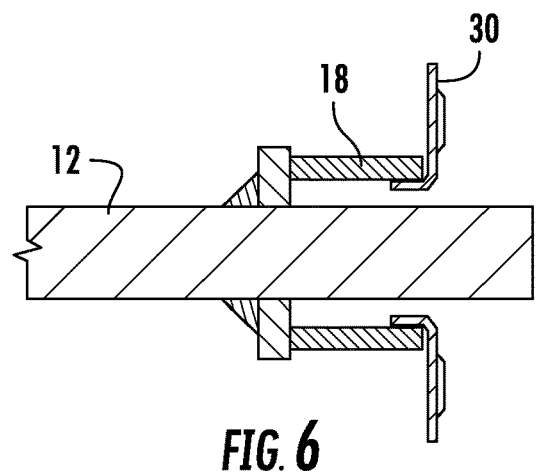
FIG. 6 is a schematic cross-sectional view showing another assembly stage of the bushing assembly of FIG. 1.
Figure 7:
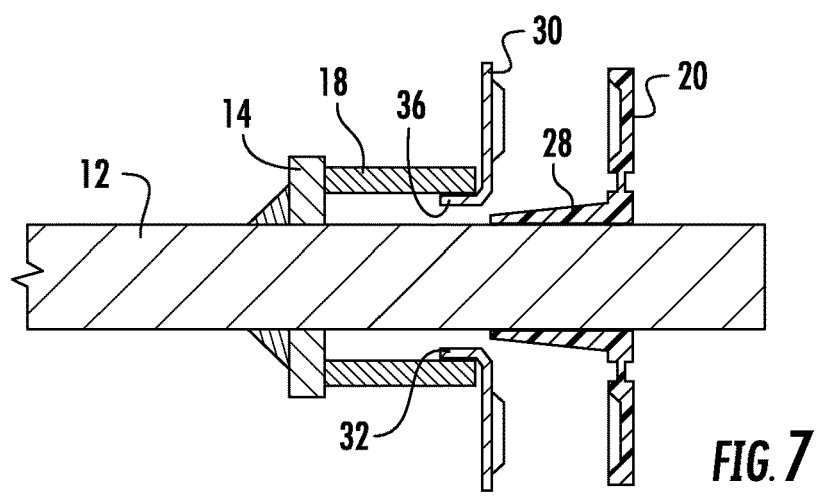
FIG. 7 is a schematic cross-sectional view showing another assembly stage of the bushing assembly of FIG. 1.
Figure 8:
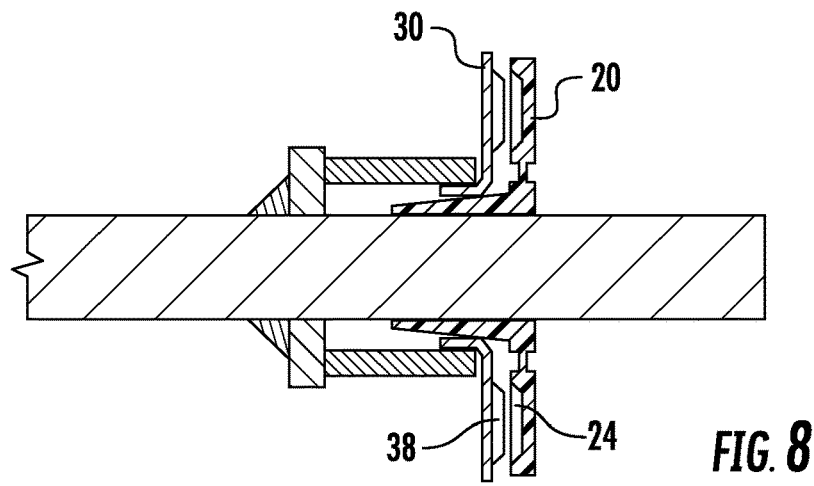
FIG. 8 is a schematic cross-sectional view showing another assembly stage of the bushing assembly of FIG. 1.

The bearing assembly/tube joint 10 is assembled by welding the axial stop 14 to a predetermined location on the tube 12 via weld 16. The spacer 18 is placed on the tube, such that the spacer abuts the axial stop 14, as shown in FIG. 5. The tube 12 is then inserted into the opening of the metal part 30, with the annular flange 32 extending into the interior of the annular spacer 18, as shown in FIG. 6. As shown in FIG. 7, the plastic bushing 20 is placed on the tube 12 with the interior surface 27 of the bushing hub cone 26 surrounding the outer surface of the tube 12. The plastic bushing 20 is advanced toward the middle part 30 until the inner threads 36 engage the engagement surface 28. A torque tool (not shown) has engagement elements that are respectively inserted into the respective torque tool engagement openings 23 of the plastic bushing 20. The openings 23 may instead be only depressions in the flange 22 that each receive a respective engagement element of the torque tool. A torque is applied by the torque tool for establishing a friction torque setting connection. The friction torque setting connection is a rotational, radial and an axial connection between the annular flange 32 and the bushing hub 26. Based on the applied torque, a radial force is applied between the annular flange 32 and the bushing hub 26, that varies with a deformation of bushing plastic material of the bushing hub 26. With engagement between the inner threads 36 and the engagement surface 28, rotation of the plastic bushing 20 results in an advancement of the engagement surface 28 along the inner threads 36, requiring higher torque for further advancement. The friction at the interior surface 27 of the bushing hub cone 26 surrounding the outer surface of the tube 12 increases with the torque—as the radial force between the annular flange 32 and the bushing hub 26 increases with the advancement and with a deformation of bushing plastic material of the bushing hub 26. The change or varying of friction between the bushing tube contact surface 27 and the tube outer bearing surface is directly a function of the torque and is predictable based on the materials used.

The radial force and the bushing friction are set upon applying a torque to the plastic bushing causing rotation of the plastic bushing 20 relative to the metal extrusion part 30. By applying the torque, and with a resulting axial movement of the plastic bushing 20 relative to the metal extrusion part 30, there is a deformation of the plastic material of the bushing hub 26 as the hub 26 advances along a course of the threading 36, to advance the inner flange surface of annular flange 36 axially relative to the surface of the bushing hub 26. This causes a deformation of the bushing hub plastic material in a region of the engaged flange inner surface 32 and the engagement surface 28 and affects a contact region of the plastic bushing 20 with the tube surface of the tube 12. This removes a clearance gap between the and the tube surface of the tube 12 and the bushing tube contact surface 27 and also sets the friction between the tube surface of the tube 12 and the bushing tube contact surface 27. Further, based on a selection of materials of the outer surface of the tube 12 and the plastic material of the tube surface of the tube 12 and the bushing tube contact surface 27, there is a predefined relationship between the torque applied to the plastic bushing 20 and the friction between the tube surface of the tube 12 and the bushing tube contact surface 27. This relationship may be determined in advance to provide a particular set friction between the tube surface of the tube 12 and the bushing tube contact surface 27. Further in a system of tube joints comprising a plurality of bearing assembly/tube joints 10, each of the plurality of bearing assembly/tube joints 10, may be set with a predetermined friction such as the same friction, based on the plastic bushing being applied to the metal part 30 and the tube 12 with the same torque.

Based on these features, a system and a method of setting a consistent and essentially equal tube joint friction are provided. The system and the method comprises providing a plurality of tube joints/bushing assemblies 10 and applying essentially the same torque to each of the plastic bushings to set the friction between each bushing contact surface and the tube or tubes outer bearing surface. Each joint has essentially the same friction set between the bushing contact surface and the respective tube outer bearing surface.

After the plastic bushing 20 and metal tube 30 are connected via the friction torque setting connection, the retainer ring 40 is placed on the tube 12 with the slip surface 44 pressed against the flange surface 25 of the plastic bushing 20. Based on the flexibility provided by the deformable web 21 (FIG. 4), bushing flange 22 moves toward the metal part 30 such that the rib or ribs 38 engage a respective groove 24. This prevents any further rotation of the plastic bushing relative to the metal part 30 to prevent any varying of the tube joint friction. As shown in FIG. 4, the Web 25 is deformable to provide sufficient movement of the bushing flange 22. FIG. 9 shows the plastic bushing with the flange 22 in an initial position (solid line) and in a pressed forward position (broken line). As shown in FIG. 9, the flexible web 21 becomes a deformed web 21D, upon pressing the flange 22 in the direction 80 with the retainer ring 40. The direction 80 is also the direction of movement of plastic bushing 20 as it is advanced to form the friction torque setting connection. Preferably, numerous grooves 24 are provided such that engagement of each rib 38 into a groove 24 is available in most rotational positions of the plastic bushing 20 relative to the metal part 30. After sufficient engagement by the rib 38 into a respective groove 24, the tube engagement edge 42 is in a set position on the tube 12 with a set friction for the tube joint 10. Based on the spring characteristics of the wall 46 of the retaining ring 40, and the edge 42 sufficiently engaging the tube 12, there is no relative axial movement of the parts of the joint 10 and no rotational movement of the plastic bushing 20 relative to the metal part 30. Further, the spring characteristics of the wall 46 allow the slip surface 44 to slip or slide relative to the flange surface 25—in an area of surface 25 free of openings 23. With this arrangement, the tube 12 and the retaining ring 40 can rotate relative to the bushing 20 and middle part 30.

FIG. 10 shows an alternative embodiment of a bearing assembly/tube joint generally designated 10'. The tube joint 10' of the embodiment of FIG. 10 is essentially the same as the tube joint 10 of the embodiment of FIG. 1 except an annular flange 32' is provided that also has a conical inner surface. Based on the conical inner surface of annular flange 32' and the conical engagement surface 28 of the plastic bushing hub 26, a change in radial force (between the annular flange 32' and the bushing hub 26) and the torque required for rotation, and a resulting friction (between the bushing tube contact surface 27 and the tube outer bearing surface) increases at a different rate, based on rotation of the bushing 20 relative to the metal part 30'.

Aspects of a further embodiment are shown in FIG. 11, in which the plastic cone of a plastic bushing 20' is shown in both an initial large state L and in a reduced state R. According to the embodiment of FIG. 11, only the plastic bushing 20' is modified and otherwise the tube joint 10" is as described for the embodiment of FIG. 1 or the tube joint 10''' is as described for the embodiment of FIG. 10. According to FIG. 11, a plastic bushing hub 26' of the plastic bushing 20' has regions of reduced plastic material or webs 29. Otherwise, the plastic bushing 20' is the same as the plastic bushing 20. The webs 29 are also referred to as hinges (bending links) 29. These hinges 29 are formed of much less plastic material than adjacent portions of the plastic bushing hub 26'. The hinges 29 also extend at an angle from a connection to one adjacent portion of the bushing hub 26' at or near to the outer surface conical engagement surface 28' and to a connection at or near to the interior (bushing tube contact) surface 27'. Each hinge 29 changes shape or collapses as the friction torque setting connection between the annular flange 32 and the bushing hub 26' is established. The reduced plastic material also provides space for the plastic material of the bushing hub 26' as the annular flange 32 presses the bushing hub 26' upon applying a torque to the plastic bushing 20' with rotation of the plastic bushing 20' relative to the metal extrusion part 30 or 30' causing axial movement of the plastic bushing 20' relative to the metal extrusion part 30 or 30'. This results in a movement 90 of extrusion engagement surface 28' radially inwardly. This also results in the movement 92 of hub inner surface (tube engagement surface) 27' radially inwardly eliminating any clearance gap.

Figure 14:
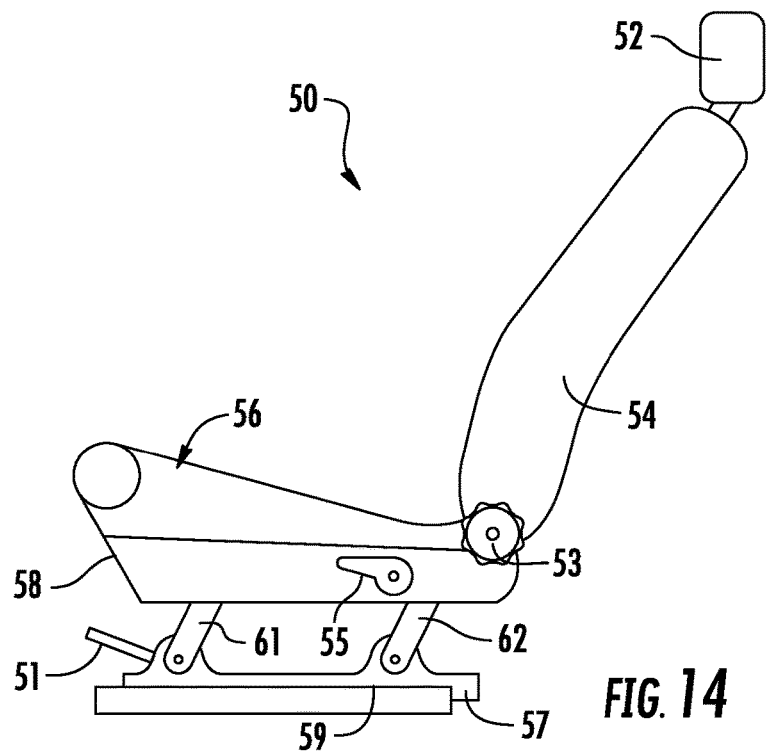
FIG. 14 is a schematic view of a vehicle seat with bushing assemblies according to the invention.

FIG. 14 shows a vehicle seat generally designated 50. The vehicle seat 50 comprises a backrest 54 and a seat base (cushion) 56 connected by a recliner fitting 53 to adjust the inclination of the backrest relative to the seat base 56. A head rest 52 is connected to the backrest 54. The seat base 56 includes a seat base frame 58 that is mounted by links 61, 62, 63 and 64 to a track system including a fixed track part 59 and a moveable track part 57. The fixed track part 59 is fixed to the vehicle floor. The movable track part 57 moves along the fixed track part 59 and may be locked in and released from a forward/backward set position by a forward/backward adjustment actuator lever 51. An easy entry actuator lever 55 can release the backrest 54 for pivoting (dumping) forward and may also release the movable track part 57 to move the vehicle seat 50 forward.

Figure 15:
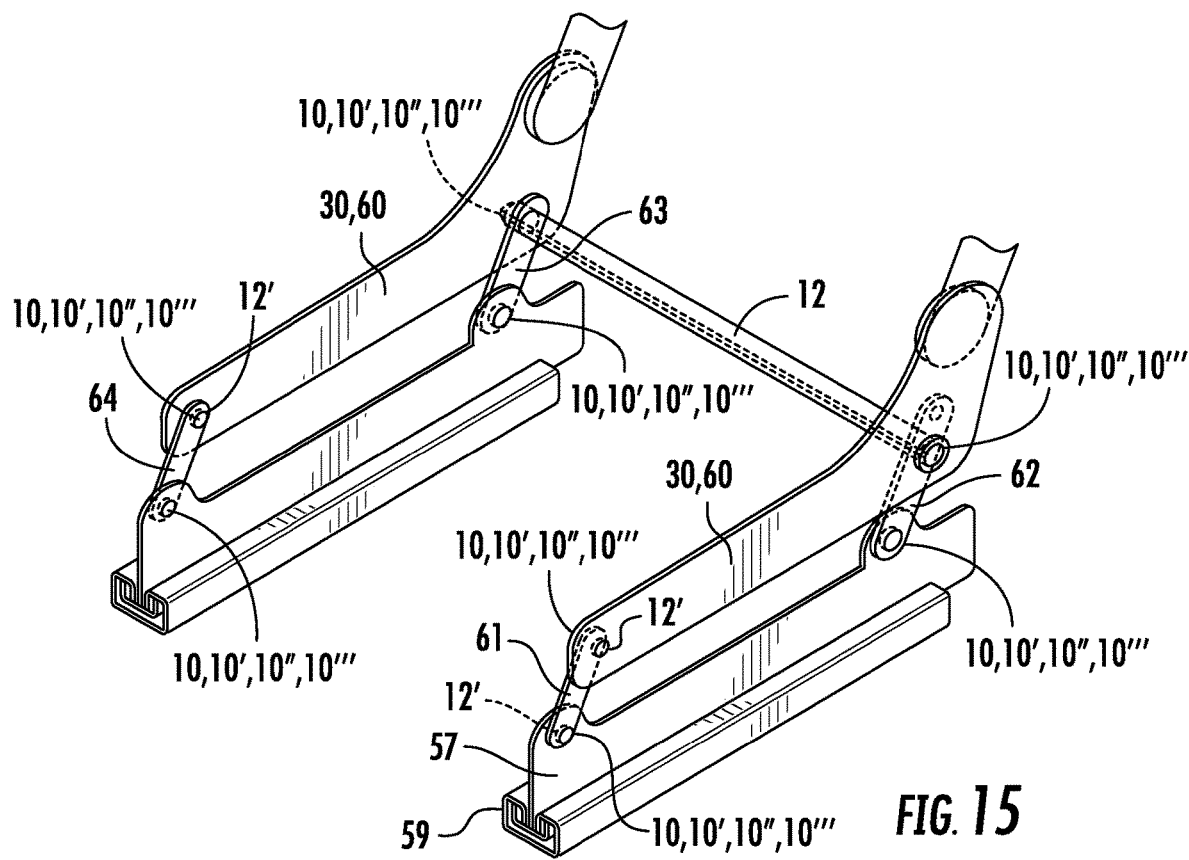
FIG. 15 is a schematic cutaway view showing four bar linkages in the vehicle seat of FIG. 14, with bushing assemblies according to the invention.

FIG. 15 shows metal extrusion parts or B-brackets 30 that are a part of the seat base frame 58. In the example shown, each B-bracket 30 has two annular flanges 32 or 32'—either or both are annular flanges 32 or conical annular flanges 32' to provide tube joints 10, 10', 10" or 10''' according to any of the embodiments discussed above. The tube joints 10, 10', 10" or 10''' at the rear side of each B-bracket 30 are formed with tube (cross shaft) 12. The tube joints 10, 10', 10" or 10''' at the front side of each B-bracket 30 are each formed with a tube 12' that has a short extent and an end stop. In the example shown, each moveable track part 57 has two annular flanges 32 or 32'—either or both are annular flanges 32 or conical annular flanges 32' to provide tube joints 10, 10', 10" or 10''' according to any of the embodiments discussed above. Each of the tube joints 10, 10', 10" or 10''' of the moveable track part 57 are each formed with a tube 12' that has a short extent and an end stop. A link 61 connects the left side front B-bracket tube 12' to the left side front moveable track part tube 12'. A link 62 connects the tube 12 to the left side rear moveable track part tube 12'. A link 63 connects the tube 12 to the right side rear moveable track part tube 12'. A link 64 connects the right side front B-bracket tube 12' to the right side front moveable track part tube 12'. The links 61, 62, 63 and 64 may also have tube openings with any of the tube joints 10, 10', 10" or 10''' according to the invention. The links 61, 62, the left side B-bracket 30 and the left side moveable track part 57, with the associated tube joints 10, 10', 10" or 10''' form a left side four bar linkage. The links 63, 64, the right side B-bracket 30 and the right side moveable track part 57, with the associated tube joints 10, 10', 10" or 10''' form a right side four bar linkage. The four bar linkages allow a height and/or inclination adjustment of the seat base (cushion), in cooperation with adjustment gearing connected thereto (not shown).

Joint systems according to the invention advantageously employ a plurality of tube joints that are set to have the same friction—the same friction torque setting between the annular flange 32 and the bushing hub 26, 26'. The tube joints 10, 10', 10" or 10'" of the left side B-bracket 30 and the right side B-bracket 30 for the cross tube 12 may be considered a system of joints. It is particularly advantageous if the joints are set to have the same friction—the same friction torque setting between the annular flange 32 and the bushing hub 26, 26' based on the same torque applied to the plastic bushing 20, 20'. In this way, the tube joint characteristics at the left and right sides of the vehicle seat 50 will be essentially the same. Each of the joints of the right side and left side four bar linkage may be considered a systems of joints. Again, it is particularly advantageous if the joints are set to the same friction—the same friction torque setting between the annular flange 32 and the bushing hub 26, 26' based on the same torque applied to the plastic bushing 20, 20'. In this way, the joint characteristics at the left and right sides of the vehicle seat 50 will be essentially the same.

A method according to the invention includes forming each joint of a joint system comprising a plurality of tube joints (bushing assemblies) which are set to have the same friction—the same friction torque setting between the annular flange 32 and the bushing hub 26, 26'. The method comprises providing a plurality of tube joints comprising one or more metal parts with annular flanges with openings and one or more tubes with a tube outer bearing surface cooperating with a plastic bushing and a further tube outer bearing surface cooperating with a further plastic bushing. The tube joints are formed by applying a torque to the plastic bushing relative to one of the metal parts that is essentially the same as torque applied to the further plastic bushing relative to one of the metal parts to set friction between the bushing contact surface and the tube outer bearing surface that is essentially the same as the friction set between the further bushing contact surface and the further tube outer bearing surface. As shown and described, the one or more metal parts of the plurality of tube joints may be the same metal part or different metal parts.

While specific embodiments of the invention have been shown and described in detail to illustrate the application of the principles of the invention, it will be understood that the invention may be embodied otherwise without departing from such principles.

LIST OF REFERENCE CHARACTERS 10 bushing assembly
10' bushing assembly
10" bushing assembly
10'" bushing assembly
12 tube
12' tube
14 axial stop
16 weld
18 spacer
20 plastic bushing
20' alternative plastic bushing
21 deformable web
21D deformed web
22 bushing flange
23 torque tool engagement openings
24 grooves
25 flange surface
26 bushing hub cone
26' bushing hub cone
27 hub inner surface
27' hub inner surface
28 extrusion engagement surface
28' extrusion engagement surface
29 hinge web
30 metal extrusion
32 extrusion annular flange
32' conical annular flange
34 opening
36 inner extrusion threads
38 extrusion ribs
40 retainer ring
42 tube engagement edge
44 slip surface
46 spring wall
50 vehicle seat
51 forward/backward adjust
52 head rest
53 recliner fitting
54 backrest
55 easy entry lever
56 seat base (cushion)
57 movable track part
58 seat base frame
59 fixed track part
60 seat base frame part (B. Bracket)
61 link
62 link
63 link
64 link
80 Direction of movement of plastic bushing
90 Movement of extrusion engagement surface 90
92 Movement of hub inner surface (tube engagement surface

What is claimed is:

1. A bushing assembly comprising:
a tube with an outer bearing surface;
a metal part comprising an annular flange defining an opening in the metal part;
a plastic bushing, with a bushing hub defining a tube opening with an inner annular bushing contact surface, the tube being received in the tube opening, and an axially extending metal part engagement surface; and
a friction torque setting connection between the annular flange and the bushing hub, the friction torque setting connection defining a rotational and axial connection between the annular flange and the bushing hub and configured to vary a radial force applied between the annular flange and the bushing hub with a deformation of bushing plastic material to vary friction between the bushing contact surface and the tube outer bearing surface upon applying a torque to the plastic bushing causing rotation of the plastic bushing relative to the metal part and causing axial movement of the plastic bushing relative to the metal part and causing the deformation of plastic material of the bushing hub.

2. A bushing assembly according to claim 1, wherein the torque applied to the plastic bushing sets the friction between the bushing contact surface and the tube outer bearing surface, based on a relationship between the friction between the bushing contact surface and the tube outer bearing surface and the torque applied to the plastic bushing.

3. A bushing assembly according to claim 2, wherein:
the annular flange has an inner flange surface defining the opening in the metal part;

the friction torque setting connection comprises threading on the annular flange inner surface;

bushing hub plastic material of the bushing hub has a change in bushing hub plastic material thickness over an axial extent of the bushing hub, whereby rotation of the plastic bushing relative to the metal part advances the engagement surface along a course of the threading to advance the inner flange surface axially relative to the surface of the bushing hub to deform the bushing hub plastic material in a contact region between the flange inner surface and the engagement surface.

4. A bushing assembly according to claim 3, wherein:
the annular flange inner flange surface is conical; and
the engagement surface is conical and the bushing hub plastic material thickness increases from a plastic bushing axial front end to an axial rear end.

5. A bushing assembly according to claim 3, wherein the engagement surface is conical and the bushing hub plastic material thickness increases from a plastic bushing axial front end to an axial rear end.

6. A bushing assembly according to claim 5, wherein the plastic bushing further comprises a bushing flange extending radially outwardly from the bushing hub.

7. A bushing assembly according to claim 6, wherein: the bushing flange comprises a circumferential engagement surface;
the metal part comprises a circumferential engagement complementary surface; and the circumferential engagement surface engages the complementary surface to rotationally fix the plastic bushing relative to the metal part.

8. A bushing assembly according to claim 7, wherein:
the circumferential engagement surface comprises a plurality of grooves circumferentially spaced and arranged about a circumferential extent of the bushing flange; and
the circumferential engagement complementary surface comprises at least one rib formed on a surface of the metal part surrounding the annular flange of the metal part.

9. A bushing assembly according to claim 8, further comprising:
an axial stop welded to the tube for stopping axial movement of the metal part and the plastic bushing, connected by the friction torque setting connection, relative to the tube in an axial direction; and
a retaining ring axially fixed to the tube and in contact with the bushing flange, the retaining ring biasing the bushing flange toward the surface of the metal part to press one of the grooves to the at least one rib to rotationally fix the plastic bushing relative to the metal part.

10. A vehicle seat base assembly comprising:
a vehicle seat base; and
a bushing assembly comprising:
a tube with an outer bearing surface;
a metal part comprising an annular flange defining an opening in the metal part;
a plastic bushing, with a bushing hub defining a tube opening with an inner annular bushing contact surface, the tube being received in the tube opening, and an axially extending metal part engagement surface; and
a friction torque setting connection between the annular flange and the bushing hub, the friction torque setting connection defining a rotational and axial connection between the annular flange and the bushing hub and configured to vary a radial force applied between the annular flange and the bushing hub with a deformation of bushing plastic material to vary friction between the bushing contact surface and the tube outer bearing surface upon applying a torque to the plastic bushing causing rotation of the plastic bushing relative to the metal part and causing axial movement of the plastic bushing relative to the metal part and causing the deformation of plastic material of the bushing hub, wherein the metal part is a side bracket of the vehicle seat base.

11. A vehicle seat base assembly according to claim 10, further comprising a further bushing assembly comprising:
a further tube with a further tube outer bearing surface, wherein the side bracket comprises a further opening defined by a further annular flange;
a further plastic bushing with a further bushing hub defining a further tube opening with a further inner annular bushing contact surface, the further tube being received in the further tube opening, and a further axially extending metal part engagement surface; and
a further friction torque setting connection between the further annular flange and the further bushing hub, the further friction torque setting connection defining a rotational and axial connection between the further annular flange and the further bushing hub and configured to vary a radial force applied between the further annular flange and the further bushing hub with a deformation of bushing plastic material to vary friction between the further bushing contact surface and the further tube outer bearing surface upon applying a torque to the further plastic bushing causing rotation of the further plastic bushing relative to the metal part causing axial movement of the further plastic bushing relative to the metal part.

12. A vehicle seat base assembly according to claim 11, wherein the torque applied to the further plastic bushing is essentially the same as the torque applied to the plastic bushing to set the friction between the further bushing contact surface and the further tube outer bearing surface essentially the same as the friction set between the bushing contact surface and the tube outer bearing surface.

13. A vehicle seat base assembly according to claim 12, wherein:
the annular flange has an inner flange surface defining the opening in the metal part;
the friction torque setting connection comprises threading on the annular flange inner surface;
bushing hub plastic material of the bushing hub has a change in bushing hub plastic material thickness over an axial extent of the bushing hub, whereby rotation of the plastic bushing relative to the metal part advances the engagement surface along a course of the threading to advance the inner flange surface axially relative to the surface of the bushing hub to deform the bushing hub plastic material in a contact region between the flange inner surface and the engagement surface.

14. A method for setting consistent friction in a tube joint, comprising:
providing a bushing assembly comprising a tube with an outer bearing surface, a metal part comprising an annular flange defining an opening in the metal part, a plastic bushing, with a bushing hub defining a tube opening with an inner annular bushing contact surface, the tube being received in the tube opening, and an axially extending metal part engagement surface, and a friction torque setting connection between the annular flange and the bushing hub, the friction torque setting connection defining a rotational and axial connection between the annular flange and the bushing hub and configured to vary a radial force applied between the annular flange and the bushing hub with a deformation of bushing plastic material to vary friction between the bushing contact surface and the tube outer bearing surface; and applying a torque to the plastic bushing causing rotation of the plastic bushing relative to the metal part and causing axial movement of the plastic bushing relative to the metal part and causing the deformation of plastic material of the bushing hub.

15. The method according to claim 14, wherein a plurality of the bushing assemblies are provided including the provided bushing assembly and a further bushing assembly and torque applied to the further plastic bushing is essentially the same as the torque applied to the bushing assembly to set friction between the further bushing contact surface and the further tube outer bearing surface essentially the same as the friction set between the bushing contact surface and the tube outer bearing surface.

16. The method according to claim 15, wherein:
the provided bushing assembly and the further bushing assembly are comprised of one or more metal parts with the annular flanges with the openings and one or more of the tubes, with one of the bushing assemblies comprising the tube outer bearing surface cooperating with the plastic bushing and the further bushing assembly comprising a further tube outer bearing surface cooperating with a further plastic bushing.

17. The method according to claim 16, wherein: the one or more metal parts of the plurality of the bushing assemblies are the same metal part with plural annular flanges or are different metal parts, each of the different metal parts having at least one of the annular flanges; and the one or more tubes comprise a same tube with the tube outer bearing surface cooperating with the plastic bushing and the further tube outer bearing surface cooperating with the further plastic bushing or comprises different tubes comprising a first tube with the tube outer bearing surface and a second tube with the further tube outer bearing surface.

18. A joint system comprising:
a plurality tube joints comprised of one or more metal parts with annular flanges with openings and one or more tubes, one of the joints comprising a tube outer bearing surface cooperating with a plastic bushing and a further of the joints comprises a further tube outer bearing surface cooperating with a further plastic bushing, each plastic bushing comprising a bushing hub defining a tube opening with an inner annular bushing contact surface, the tube being received in the tube opening, and an axially extending metal part engagement surface and a friction torque setting connection between the annular flange and the bushing hub, the friction torque setting connection defining a rotational and axial connection between the annular flange and the bushing hub and configured to vary a radial force applied between the annular flange and the bushing hub with a deformation of bushing plastic material to vary friction between the bushing contact surface and the tube outer bearing surface upon applying a torque to the plastic bushing causing rotation of the plastic bushing relative to the metal part causing axial movement of the plastic bushing relative to the metal part and deformation of plastic material of the bushing hub, wherein the tube joints are formed by applying a torque to the plastic bushing relative to one of the metal parts that is essentially the same as torque applied to the further plastic bushing relative to one of the metal parts to set friction between the bushing contact surface and the tube outer bearing surface that is essentially the same as the friction set between the further bushing contact surface and the further tube outer bearing surface.

19. A joint system according to claim 18, wherein:

the one or more metal parts of the plurality of tube joints are the same metal part with plural annular flanges or are different metal parts, each of the different metal parts having at least one of the annular flanges; and the one or more tubes comprise a same tube with the tube outer bearing surface cooperating with the plastic bushing and the further tube outer bearing surface cooperating with the further plastic bushing or comprises different tubes comprising a first tube with the tube outer bearing surface and a second tube with the further tube outer bearing surface.

* * * * *